Figure 1:
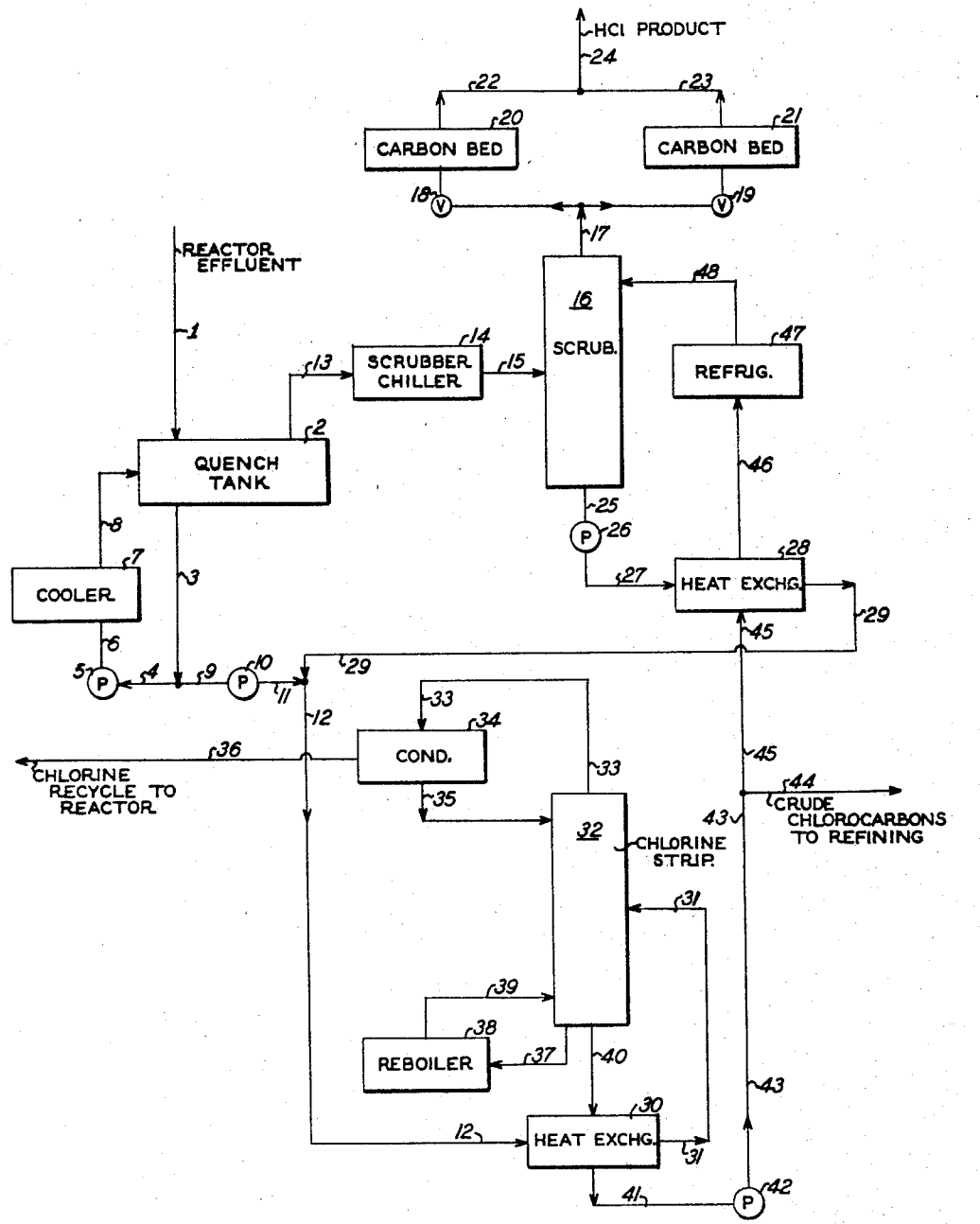

FREEZING POINT FOR MIXTURES
OF CARBON TETRACHLORIDE
AND PERCHLOROETHYLENE

United States Patent Office 3,429,939
Patented Feb. 25, 1969

3,429,939
PROCESS FOR PRODUCING CARBON TETRA-CHLORIDE AND PERCHLOROETHYLENE
Uyanik Yildirim, Jackson Heights, Monroe Malow, Westbury, Cary H. Lourie, Long Island City, and Barry Evans, New York, N.Y., assignors to Halcon International, Inc., a corporation of Delaware
Filed Aug. 5, 1965, Ser. No. 477,463
U.S. Cl. 260—654       8 Claims
Int. Cl. C07c *17/24;* C07b *9/00*

This invention relates to a process for the chlorination of lower aliphatic hydrocarbons and their partially chlorinated derivatives. More specifically it relates to a process for the preparation of carbon tetrachloride and perchloroethylene from aliphatic hydrocarbons and partially chlorinated aliphatic hydrocarbons having from one to three carbon atoms. Even more specifically it relates to a novel product recovery scheme which greatly simplifies process operations, and reduces equipment and operating costs.

Thermal chlorinations of aliphatic hydrocarbons are well known in the art. Carbon tetrachloride and perchloroethylene are produced commercially, for example, by reacting methane, ethane, ethylene, propane or propylene or mixtures thereof in the vapor phase with chlorine at temperatures of about 400 to 800° C.

Through proper control of reactor temperature and pressure, the stoichiometric excess of chlorine used in the reaction, and the quantity and nature of chlorinated hydrocarbons recycled to the reactor, it is possible to produce almost any desired ratio of carbon tetrachloride to perchloroethylene. These methods of process control are well known and have been disclosed in U.S. Patent No. 2,442,324 and others.

A major process problem confronting the art is the recovery of the desired products and recycle streams from the reactor effluent. The effluent contains the products, several other species of chlorocarbon, for example, hexachlorobutane and hexachlorobenzene, by-product hydrogen chloride, unconverted chlorine and inert gases introduced via the hydrocarbon and/or chlorine feed streams. Chlorine must be separated from the reactor effluent and recycled to the reactor to maintain the stoichiometric excess in the reaction and to avoid loss of chlorine values from the process. Unwanted chlorocarbons must be either purged from the process or recycled to their extinction. Carbon tetrachloride or perchloroethylene must be recycled to control product distribution and also to provide sufficient reaction mass for reactor temperature control.

Of paramount importance in the recovery operation is the rapid quench of the reactor effluent. The gas mixture must be reduced from the reactor effluent temperature of 400 to 800° C. to less than 150° C. almost instantaneously to avoid formation of by-product chlorocarbons. This has been accomplished in the past in either a "dry quench" or a "wet quench" process.

In the "wet quench" method the reactor effluent is introduced below the surface of an aqueous solution of hydrogen chloride in water; the organics are therein instantaneously cooled and condensed, the hydrogen chloride is dissolved in the water and the chlorine vapor which remains uncondensed, is, after a cleanup water scrubbing, recycled via a compressor to the reactor. The organic condensate and the aqueous hydrogen chloride in the quench zone form separate phases and are separated by decantation. The organic layer, after suitable drying, is treated by known distillation techniques to separate the products, waste streams and recycle streams. The aqueous phase is further processed to remove the hydrogen chloride either as an aqueous solution or as an hydrous vapor.

The main drawback inherent in the wet quench scheme is in the costly materials required to contain the quench solution. Brick-lined and graphite vessels are used and even with these materials plant corrosion is an ever present cost and hazard. The organics distillation equipment is constructed of carbon steel, but the organics must be carefully dried before distillation is commenced.

The "dry quench" scheme is a considerable improvement over the "wet quench" scheme. As taught in U.S. Patent 2,442,324 the hot gaseous reactor effluent can be quenched in an anhydrous chlorocarbon medium. By suitable arrangement of distillation equipment at the quench zone it is possible to remove the sensible heat in the reactor effluent mixture and provide a mixture of carbon tetrachloride, hydrogen chloride and chlorine vapors to a distillation column condenser. The carbon tetrachloride is then separated by partial condensation and the mixture of chlorine and hydrogen chloride is separated by water scrubbing. The chlorine vapors after sulfuric acid scrubbing to remove all traces of water are recycled via a compressor to the reactor.

There are several distinct advantages in this process scheme. Since the quench takes place in a non-aqueous medium the materials of construction in the quench zone need not be graphite and brick-lined steel; thus considerable economies are achieved. However, a distillation column is required for purposes of providing the quench medium. In addition the chlorine-hydrogen chloride separation still requires a water scrubbing with its attendant problems and the chlorine vapors must be dried in sulfuric acid and recycled via a compressor.

A process has now been developed whereby the reactor effluent can be quenched in a non-aqueous chlorocarbon medium wherein no quench zone distillation and vapor condensation steps are required to provide a quench medium and remove the latent heat of the reactor effluent gases, and the hydrogen chloride can be separated from the chlorine without resorting to a water scrubbing system. It has been discovered that maximum economies can be achieved by removing the sensible and latent heat of the reactor effluent in a quench medium. By totally condensing the chlorocarbon contained in the reactor effluent which, of necessity, contains a mixture of carbon tetrachloride and perchloroethylene regardless of the plant production ratio of these compounds, one is provided with a quench medium which permits the further process steps hereinafter to be described. To condense chlorocarbons in the reactor effluent it is necessary to continuously cool the quench medium. This is accomplished by circulating the quench medium with the condensed chlorocarbons from the reaction effluent through a cooler and recirculating the cooled mixture back to the quench zone.

Since essentially all the chlorocarbon is condensed in the quench medium only the chlorine and hydrogen chloride remain in the vapor phase of the quench zone. It has been discovered that the chlorine can be most efficiently separated from the hydrogen chloride by scrubbing the hydrogen chloride with the quench medium at greatly reduced temperatures. The lower the temperature at which the hydrogen chloride and chlorine vapor mixture s scrubbed, the more efficent is the separation of the chlorine from the hydrogen chloride. Since the freezing point of carbon tetrachloride-perchloroethylene mixtures if markedly lower than the freezing point of either of the two pure components, the most effective scrubbing medium is the very same crude mixture which is used as the quench medium. If, therefore, a stream of quench medium is removed from the quench zone, and refrigerated, it can be used as the lean scrubbing liquor in the scrubbing operation. The vapor which leaves the scrubbing operation is pure, chlorine-free, chlorocarbon free, hydrogen chloride. The liquor leaving the bottom of the scrubbing operation is comprised of the crude chlorocarbon scrubber liquor and absorbed chlorine. Part or all of this mixture is then stripped of its chlorine content. The chlorine is recycled to the reactor and the stripped chlorocarbon is reused in the scrubbing operation. The unstripped mixture may also be recycled directly to the reactor.

A portion of the stripped chlorocarbon liquor is refined to separate the product streams and whatever chlorocarbon recycle streams are desired for purposes of controlling product distribution and reactor temperature.

FIGURE 1 sets forth a typical process flow-sheet which incorporates the invention. Reactor effluent containing carbon tetrachloride, perchloroethylene, hydrogen chloride, chlorine and various minor amounts of other chlorocarbon by-products is introduced via line 1 below the surface of the quench medium contained in quench tank 2. The reactor effluent is at from 400 to 800° C. and is instantaneously quenched by contacting the quench medium which is maintained below about 100° C.

The quench medium is comprised of carbon tetrachloride, perchloroethylene, and other chlorocarbon by-products as well as minor amounts of dissolved chlorine and dissolved hydrogen chloride. The sensible heat (above the quench temperature) of the entire reactor effluent and the latent heat of the chlorocarbons contained therein is given up to the quench medium. To maintain a constant quench tank temperature, a stream of quench medium is continuously removed, pumped through a quench medium cooler and returned to the quench tank. This stream is removed from the quench tank via lines 3 and 4. It is pumped in pump 5, via line 6 to quench cooler 7, and after cooling therein passes via line 8 back to the quench tank.

Minor amounts of hydrogen chloride and chlorine are dissolved in the quench medium during the quench. The major portion of these compounds, however, and minor equilibrium amounts of chlorocarbon remain uncondensed. These vapors pass from the quench zone via line 13 to scrubber chiller 14 wherein they are further cooled and then pass via line 15 to hydrogen chloride scrubber 16.

In hydrogen chloride scrubber 16 the chilled vapors from the quench zone are contacted with a stream of refrigerated crude chlorocarbon which will be hereinafter described. After countercurrent contact with the refrigerated crude chlorocarbon the hydrogen chloride vapor is free of its chlorine content. The hydrogen chloride leaving the scrubber is also essentially free of chlorocarbon since the temperature of the refrigerated crude chlorocarbon at the top of the scrubber is so low as to reduce the vapor pressure of that stream to a minimum. The hydrogen chloride vapor is removed via line 17 and if a final purification is desired may be passed through beds of activated carbon. The accompanying drawing shows two carbon beds in parallel; while one is in operation the other can be regenerated by various methods known to the art. The hydrogen chloride and chlorine pass, for example, via line 18 to carbon bed 20 and after leaving minute amounts of chlorine and chlorocarbon therein pass via lines 22 and 24 out of the process.

The bottoms stream from hydrogen chloride scrubber 16 passes via line 25 to pump 26. It then passes via line 27 to hydrogen chloride scrubber liquor heat exchanger 28, via line 29 to line 12 wherein it is mixed with the liquid phase from the quench tank. The liquid phase from the quench tank which contains minor amounts of chlorine and hydrogen chloride passes via lines 3 and 9 to pump 10. It is pumped via line 11 to line 12 wherein it is mixed with the bottoms from the hydrogen chloride scrubber. The mixed streams pass through chlorine stripper feed-bottoms exchanger 30 wherein they are preheated by hot stripper bottoms and via line 31 to chlorine stripper 32. Chlorine and what minor amounts of hydrogen chloride have been dissolved in the two feed streams are stripped from the chlorocarbon in chlorine stripper 32. The chlorine, hydrogen chloride and some chlorocarbon pass via line 33 to chlorine stripper overhead condenser 34. Most of the chlorocarbon is condensed out in this unit and is returned to chlorine stripper 32. The remainder of the stream passes via line 36 to the reactor. Heat is supplied to the chlorine stripper in chlorine stripper reboiler 38. A stream of chlorine stripper bottoms passes via line 37 to reboiler 38 and as vapor via line 39 to chlorine stripper 32.

The chlorine stripper bottoms which are chlorine and hydrogen chloride free pass via line 40 to chlorine stripper feed-bottoms exchanger 30 wherein they are cooled by heat exchange with the chlorine stripper feed. The cooled bottoms then pass via line 41 to pump 42. A portion of the bottoms pass via lines 43 and 44 to the chlorocarbon refining section not shown. In this section the carbon tetrachloride and perchloroethylene are separated by normal distillation procedures. Heavier chlorocarbon by-products such as hexachlorobenzene and hexachlorobutane are also removed. These by-products and some portion of the carbon tetrachloride or perchloroethylene may be recycled from the refining section to the reactor in order to respectively extinguish the by-products without yield loss and control product distribution and reactor temperature. This technology is fully disclosed in the prior art.

In the present invention a second portion of the cooled chlorine stripper bottoms passes via line 45 to hydrogen chloride scrubber liquor heat exchanger 28 wherein it is further cooled. It then passes via line 46 to hydrogen chloride scrubber liquor refrigerator 47 wherein its temperature is still further reduced. It then passes via line 48 to hydrogen chloride scrubber 16 wherein it absorbs chlorine from the chilled hydrogen chloride vapor from the quench zone.

The foregoing example is meant to be illustrative only of the invention; for example, the several heat and "cold" reclaiming exchangers may be either eliminated or augmented as economics dictate.

One of the more significant advantages of the aforedescribed process lies in the fact that no chlorine compressor is required to recycle the excess chlorine which is required by the reaction. By removing chlorine from the hydrogen chloride via the liquid phase of a scrubbing operation and by subsequently stripping the chlorine from rich absorber liquor at a pressure in excess of the reactor pressure no expensive, cumbersome chlorine compressor is required.

The pressure at which the quench takes place may be broadly from 0 to 100 p.s.i.g. It is disadvantageous to operate under vacuum since a vacuum exhaust system must be employed. The quench zone pressure is, in actuality, the reactor effluent pressure. In general, it is preferred to operate at high reactor pressures since equipment sizes and the quench zone mass transfer operations are considerably aided thereby. However, at higher pressures the cost of the reactor is significantly increased; there is therefore an economic limit to reactor pressure. Furthermore, since the pressure in the chlorine stripper must be sufficiently higher than in the reactor to permit chlorine recycle without a compressor the process pressure is limited by the limit of chlorine stripper pressure. It has been found that if the chlorine stripper pressure exceeds 90 p.s.i.g. the boiling temperatures of the chlorocarbon contained therein are high enough to cause decomposition and loss in yield. In preferred operation therefore the reactor effluent pressure will be from 0 to 85 p.s.i.g. It is most desirable to maintain a reactor effluent pressure of from 5 to 50 p.s.i.g.

The quench zone temperature is controlled by the quench cooler. It is desirable to maintain as low a temperature in the quench zone as possible since at lower temperatures there will be less chlorine and chlorocarbon contained in the hydrogen chloride effluent from the quench zone. However, since it is expensive to remove the considerable, sensible and latent heat of the reactor effluent at a low temperature, a balance must be struck. The quench zone temperature must not be in excess of 150° C., however, since above this temperature side reactions to unwanted chlorocarbons may occur and at the preferred system pressure little if any chlorocarbon will condense. Furthermore the quench temperature should not be lower than 0° C. in order to insure that some of the heavier chlorocarbon by-products remain in the quench solution rather than deposit in the quench tank and associated equipment. Thus the quench zone temperature can be broadly from 0 to 150° C. It is preferred to maintain this temperature at from 25 to 125° C. and best results are obtained when the quench zone temperature is from 35 to 100° C.

The vapor from the quench zone is preferably chilled before introduction into the hydrogen chloride scrubber. This reduces the heat load on that scrubber thus reducing the amount of refrigerated scrubbing liquor which is required. The vapor effluent from the quench zone can be chilled to from 30 to −50° C. Desirably it will be chilled to from 10 to −40° C. and best results are obtained when it is chilled to from 0 to −30° C.

The chlorine stripper pressure must be at least 5 p.s.i.g. in excess of the reactor pressure to permit the chlorine to recycle to the reactor. Generally speaking, the chlorine stripper pressure should be from 5 to 90 p.s.i.g. Desirably, the pressure should be from 20 to 70 p.s.i.g. and best results are obtained when the pressure is maintained at from 30 to 50 p.s.i.g.

Figure 2:
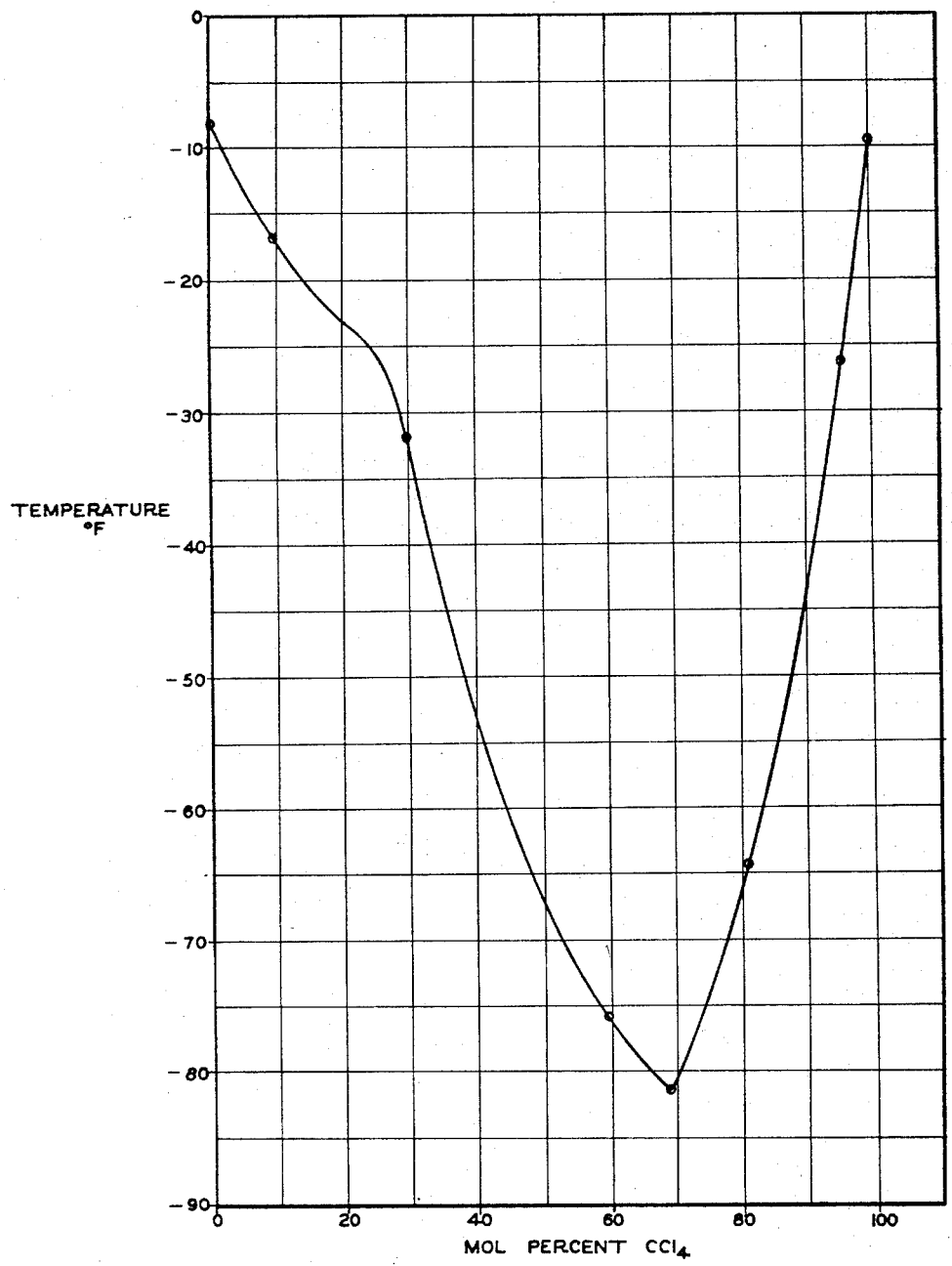

The stream of crude chlorocarbon which is returned to the hydrogen chloride scrubber to absorb the chlorine is desirably refrigerated to a very low temperature. The lower the temperature of this stream the more efficient will be the scrubbing operation. Furthermore, less scrubbing liquor need be recycled if the temperature is lower. A still further advantage of low temperature is that less chlorocarbon will be lost in the hydrogen chloride overhead and it may even be possible to minimize or even obviate the necessity for carbon beds. The relative amounts of carbon tetrachloride, perchloroethylene and chlorocarbon by-products in the chlorine stripper bottoms will depend entirely upon the desired ultimate product distribution, the quantity of chlorocarbon recycled to the reactor and other process variables. It is thus impossible to generalize as to the scrubber liquor composition; the scrubber feed temperature should not be so low as to cause freezing of the scrubber liquor. The freezing point curve depicted in FIGURE 2 is a guide therefore to the lower limit of this temperature. It has been found that the scrubbing liquor temperature should be less than 0° C., that good results are obtained when the temperature is less than −10° C., and that best results are achieved if the temperature is less than −20° C., assuming throughout that the composition of the stream is such as to permit this temperature without freezing.

The ratio of chilled scrubber liquor to scrubber vapor feed depends upon the quench zone pressure and the liquor temperature. Broadly the ratio should be from 0.5 to 25 pounds of liquor per pound of vapor. It is preferred to use from 1 to 15 pounds of liquor per pound of vapor and best results are achieved if 2 to 8 pounds of liquor per pound of vapor are used.

In view of the foregoing disclosures, variations and modifications thereof will be apparent to one skilled in the art, and it is intended to include within the invention all such variations and modifications as do not come within the scope of the appended claims.

What is claimed is:
1. In a process for the production of carbon tetrachloride, perchloroethylene or mixtures thereof comprising thermally chlorinating in the vapor phase at least one member selected from the group consisting of lower aliphatic hydrocarbons and partially chlorinated derivatives theerof in a reaction zone to produce an effluent containing chlorocarbons, hydrogen chloride and chlorine, and quenching said effluent in a quench zone containing a quech medium consisting essentially of carbon tetrachloride and perchloroethylene, the improvement comprising maintaining conditions of said quench zone to effect substantially complete condensation of all the chlorocarbons of said effluent, scrubbing uncondensed vapor comprising hydrogen chloride and chlorine from said quench zone with refrigerated absorbent consisting essentially of carbon tetrachloride and perchloroethylene to absorb said chlorine from said hydrogen chloride and form chlorine-rich scrubber liquor, removing condensate-containing quench medium from said quench zone, combining said removed condensate-containing quench medium with said chlorine-rich scrubber liquor and subjecting the resultant mixture to a stripping step to separate chlorine as overhead and scrubber liquor as stripper bottoms, recycling separated chlorine to said reaction zone and recovering product chlorocarbons from a portion of the stripper bottoms, the remainder of the stripper bottoms being recycled to said scrubbing step after refrigerating as said absorbent.

2. A process as recited in claim 1 wherein the quench zone is maintained at a pressure of from 0 to 85 p.s.i.g. and at a temperature of from 0 to 150° C.

3. A process as recited in claim 2 wherein said quench zone temperature is maintained by removing a stream of quench medium and circulating it through a cooler external to said quench zone.

4. A process as recited in claim 2 wherein prior to said scrubbing step said hydrogen chloride and chlorine are chilled to from 30 to −50° C.

5. A process as recited in claim 2 wherein the absorbent used to scrub chlorine from hydrogen chloride is refrigerated to less than 0° C.

6. A process as recited in claim 2 wherein the stripping operation is performed at a pressure of from 5 to 90 p.s.i.g. and said stripping pressure is at least 5 p.s.i.g. greater than the quench zone pressure so as to permit the direct recycle of chlorine to the reaction zone.

7. A process as recited in claim 2 wherein the ratio of refrigerated stripper bottoms fed to the scrubbing step to uncondensed vapor fed to the scrubbing step is 0.5 to 20 lbs. of stripper bottoms per pound of vapor.

8. A process as recited in claim 2 wherein a portion of chlorine-rich scrubber liquor is recycled directly to the reaction zone.

References Cited
UNITED STATES PATENTS 2,442,324 5/1948 Heitz et al.
2,841,243 7/1958 Hooker et al.

BERNARD HELFIN, Primary Examiner.

J. A. BOSKA, Assistant Examiner.

U.S. Cl. X.R.
260—664